United States Patent
Newman

(10) Patent No.: US 7,805,419 B2
(45) Date of Patent: Sep. 28, 2010

(54) SYSTEM FOR TRACKING AND ANALYZING THE INTEGRITY OF AN APPLICATION

(75) Inventor: Aaron Charles Newman, New York, NY (US)

(73) Assignee: Application Security, Inc., New York, NY (US)

( * ) Notice: Subject to any disclaimer, the term of this patent is extended or adjusted under 35 U.S.C. 154(b) by 0 days.

(21) Appl. No.: 11/483,505

(22) Filed: Jul. 10, 2006

(65) Prior Publication Data

US 2007/0022480 A1    Jan. 25, 2007

Related U.S. Application Data

(60) Provisional application No. 60/698,215, filed on Jul. 11, 2005.

(51) Int. Cl.
*G06F 17/30* (2006.01)
(52) U.S. Cl. .......................... 707/695; 726/22
(58) Field of Classification Search ............... 707/203, 707/999.203, 695; 726/22–26
See application file for complete search history.

(56) References Cited

U.S. PATENT DOCUMENTS

| | | | |
|---|---|---|---|
| 6,584,569 B2 * | 6/2003 | Reshef et al. | 726/25 |
| 6,892,391 B1 * | 5/2005 | Jones | 725/143 |
| 7,150,045 B2 * | 12/2006 | Koelle et al. | 726/26 |
| 7,194,769 B2 * | 3/2007 | Lippmann et al. | 726/25 |
| 7,287,249 B2 * | 10/2007 | Coyle et al. | 717/168 |
| 2002/0105548 A1 * | 8/2002 | Hayton et al. | 345/764 |
| 2002/0116406 A1 * | 8/2002 | Goldick | 707/203 |
| 2003/0191737 A1 * | 10/2003 | Steele et al. | 707/1 |
| 2005/0193430 A1 * | 9/2005 | Cohen et al. | 726/25 |

* cited by examiner

*Primary Examiner*—James Trujillo
*Assistant Examiner*—Jorge A Casanova
(74) *Attorney, Agent, or Firm*—Peter S. Canelias

(57) ABSTRACT

The invention is a method for tracking and analyzing an application for modifications and changes. The method is used to ensure the integrity of the application remains intact. The application is inventoried upon setup. The application is then subsequently re-inventoried on a regular basis. Each new inventory is examined against the original inventory to determine if any changes have taken place. When a change is detected, the change is highlighted to be approved or examined to determine the specifics of the change in order that corrective action can be taken if deemed necessary.

16 Claims, No Drawings

SYSTEM FOR TRACKING AND ANALYZING THE INTEGRITY OF AN APPLICATION

CROSS REFERENCE TO RELATED APPLICATION

This application claims priority to provisional application for patent Ser. No. 60/698,215, filed Jul. 11, 2005, which is incorporated herein by reference in its entirety and for all purposes.

BACKGROUND OF THE INVENTION

1. Field of the Invention

The present invention relates generally to a method and system for tracking and analyzing changes in an application, particularly, the invention relates to detecting modifications in an application that may be the results of malicious or unauthorized activity including creating backdoors, Trojan horses, and viruses. As well, the invention provides for a method of determining what objects may have been modified in unauthorized ways by developers, administrators, attackers, or end users.

2. Description of Related Art

Organizations have traditional monitored their networks at the perimeter and at the operating system level to catch attacks. Unfortunately, in an ever-changing world, perimeter security has failed to provide adequate security. Modern networks are too complex to expect perimeter security to hold up. Organizations are forced to open up their networks to business partners and customers making perimeter security obsolete.

Attackers have traditional gone after network infrastructure including such devices as routers, virtual private networks (VPNs), and firewalls. While it was unfortunate when an attacker was able to break into one of these pieces of network infrastructure, the damage caused was never particularly crippling to the workings of the organization because these devices did not contain critical business data. The worst case scenario was that passwords would need to be reset, patches would need to be installed, and the hardware would need to be reset. Attackers have gradually become more sophisticated and have begun to direct their attention to a different target—the application.

One important aspect of security is being able to detect when an attack has been successful and when some unauthorized action is successful. A successful attacker will typically install back doors, Trojan horses, viruses, or other malware into an application in order to gather additional data or provide further access to the application. This type of malicious activity can be detected by monitoring critical components of the application watching for changes to components that shouldn't necessarily change. For instance, when a system stored procedure in a database is modified, the administrator or security officer for the database should be aware that a modification to a critical system object has been made. The administrator or security officer should then be able to go in and review the change and rollback the change if it is not authorized.

SUMMARY OF THE INVENTION

This invention seeks to provide a base-lining tool for monitoring and detecting potential changes or modifications in an application. In an application environment, generally speaking, the base-lining tool connects to the application and creates an inventory of the objects, settings, and values in the application, also referred to as items. Subsequently the application is connected to on a periodic basis and the inventory of objects, settings, and values in the application are compared to the baseline inventory of objects, settings, and values. The differences between the baseline inventory and the current state inventory or re-inventory are recorded as the application modifications. These application modifications can be reviewed and compared to the original inventory to review what changes have been made. After approving or rejecting changes, the inventory can be updated to reflect the new state of the objects, settings, and values.

It is an object of the present invention to provide a system and method that give the user the ability to monitor applications for changes at the application level so as to determine whether unauthorized activity has occurred.

Another object of the invention is to provide a sophisticated detection system which can detect when an item in the application has changed, and record the result for future reference.

Another object of the invention is to provide an intuitive graphical interface that allows for easy configuration and monitoring of multiple applications to determine unauthorized activity in a plurality of applications.

Another object of the invention is to provide a scalable architecture that allows a single instance of the invention to monitor thousands of applications.

DETAILED DESCRIPTION OF THE PREFERRED EMBODIMENTS

The invention is a security solution designed to monitor and detect changes to the integrity of an application. The invention operates at the application level providing a method of inventorying a variety of items in any type of application including web applications, groupware applications, email applications, database applications, enterprise resource planning application, and any other type. The invention detects and highlights changes to the application.

In a preferred embodiment, the invention may be implemented either as a process in software or in a hardware process. The invention, however, is not limited to this embodiment. The invention has many features to aid the user in monitoring applications. These include:

The ability to monitor applications for changes at the application level;

A sophisticated detection system which can detect when an item in the application has changed;

An intuitive graphical interface that allows for easy configuration and monitoring of multiple applications; and A scalable architecture that allows a single instance of the invention to monitor thousands of applications.

The preferred embodiment of the invention consists of a single component—a local software component running on a local machine running against multiple remote applications. The invention, however, may also exist in other forms. The invention can consist of agents on each of the applications being monitored. As well, the invention can operate as a web application allowing users of the invention to connect using a web browser to the invention.

The invention operates by monitoring for changes in an application such as a web application or a database application. The invention can be referred to as a policy driven database or application integrity checking tool or as a change auditing tool.

Monitoring for changes does not occur in real-time. The invention is instead designed to take a snapshot of the application in the current state, and then periodically look at the application to determine if any items, objects, settings, or values in the application have changed. The invention provides a "differences analysis" of the application showing what items have been modified.

The invention starts by collecting a baseline of all the items selected in the policy. This collection is then saved or stored for the application as the baseline. The invention will then be able to "analyze the database for changes" at a later time. When this happened, the invention would collect all the application items again looking for changes. If changes are found it would record the specific changes.

When a change does occur, the invention would then need to be able to review and accept the changes, making the change part of the baseline or not. The invention provides the capability to look back at the state of the items in the past.

This capability protects against Trojan horses being installed on the application as well as being useful for people wanting to see what has changed when something malfunctions. For example, the invention would allow the user to look at what permissions have changed, what database objects have changed, what users and roles have been added, etc.

The invention takes a snapshot of the application, recording information such as:

All objects (tables, views, stored procedures, functions, rules, triggers, etc . . . )

Body of user-defined stored procedures

Body of system stored procedures

Extended stored procedures

File size and hashes of extended stored procedures DLLs

Values in sysconfigures

Values in the registry under the application keys

Databases, devices and files

Version

Users

User passwords

Logins

Roles

Packages

Alerts

Jobs

Operators

Replication items

Server roles

Linked servers

Remote servers

The invention also allows users to take a snapshot of table information such as the following:

Number of rows

Monitor for changes in the table to any data per column or for the whole table

Rows

The invention would allow them to set a policy that dictates in which of these items to look for changes. The invention is designed to support multiple platforms ranging from databases to web applications to enterprise resource planning (ERP) systems.

Components

The main screen display of the embodiment would consist of a tree view on the left side of the screen. The tree view would include a node for the application name. Under the application name is the name of each category of item that the invention monitors for changes. Under each node category would be a list of the items in the baseline inventory. On the right side of the screen, the invention would have two panes. The top pane would give details of the items, listing the item type, last date changed, etc. The bottom right pane would list the dates the item changed.

The invention would provide a function to "analyze application for changes". The function would connect to the application and pull back all the items specified in the policy. The invention would then see if an item had deviated from the baseline. If an item had changed, the details of the new object would be updated and the status of the item would be updated to CHANGED. If the item is deleted, the status of the item would be updated to DELETED.

Once "analyze application for changes" is completed, the user can then double-click on the item that has changed. This would bring up a display screen with two panes comparing the old and new objects, and highlight the changes. The invention also allows the user to click the item that has changed and select "add to base-line". This will reset the item and incorporate it into the baseline.

The main screen of the preferred embodiment has a toolbar that includes the options New, Open, Check, Policy, Reports, and Schedule. "Open" will open a screen that lists the saved applications and baselines. "New" will prompt the user for an application name and a policy to apply. "Check" will prompt the user and then run a new analysis. "Policy" will list the policies and allow the user to select a single policy to apply to the current application. "Schedule" will allow them to setup times to run "Analyze" and to send reports after it is finished.

Policy Editor

The invention preferably has a tree view with Nodes for each of the item types that can be collected. Checkmark can be placed next to each item that the user desires to collect in the baseline inventory. The policy can then be saved. The policy can also be later applied to an application.

For larger objects, the invention may save the entire object or may save a SHA1 hash or CRC check. For small objects the invention can save the entire name of the item along with the body of the item, etc. The specific attributes of the item to be saved is configurable according to the desires of the user.

Reports

After running a baseline or performing an analysis, the invention preferably will produce a report which is a tree view. Under each category (and possibly sub categories) the invention will list the items that have changed. Icons next to the item will indicate if the change is an addition, deletion, or modification.

Applications

The invention can be specifically adapted for testing various types of applications. For an application executing on a computer system, the method would comprise inventorying the application in order to discover a first inventory of existing objects, settings, or values (collectively defined as "items") in the application, storing the first inventory of existing objects, settings, and values of the application, collecting a second inventory list of objects, settings, and values in the application, and comparing the second inventory list of objects, settings, and values with the first inventory of the application.

Typical objects would include tables, triggers, views, stored procedures, indexes, databases, schema, functions, files, HTML or XML pages, web pages, virtual directories, web directories, dynamic scripts, or source code. Typical applications include web servers or web applications, and database applications. Typical settings include configuration options, permission settings, access control settings, or system parameters. Typical values include strings, numeric or binary data stored in a table or file.

When a comparison is made between a first inventory list and a subsequent list of objects, settings, and values, the method includes looking for objects, settings, or values (items) that have been dropped, created, modified, recreated, expanded, or reduced, collectively referred to as changes. Collecting the inventory list of objects preferably includes examining the metadata or data dictionary associated with the application. Collecting the list of settings includes calling functions or methods within the application to enumerate configuration options.

Creating a base-line for the comparison, i.e., to detect changes, would include connecting to the application, running commands or requests in order to enumerate the items in the application, and saving information on items in the application to persistent storage. The re-inventorying or subsequent compilation of items would include connecting to the application on a periodic basis subsequent to the baseline compilation, running commands or requests in order to enumerate the items in the application, and collecting information on items in the application. The determination of whether the items have been changed would include the steps of enumerating each item in the re-inventory (i.e., the second or subsequent inventory) with items in the baseline inventory, determining if any items exist in the baseline but not in the re-inventory, determining if any items exist in the re-inventory but not in the base-line, and determining if any items in both the base-line and the re-inventory have been changed.

The baseline inventory may be updated by incorporating modifications found in a re-inventory (second or subsequent compilation) by updating the base-line with an item from the re-inventory, removing the item from the baseline if it no longer exists in the re-inventory, adding the item to the base-line if it is not in the baseline and exists in the re-inventory.

Database Applications

For analyzing a database, the method would include collecting a list of items in the database, setting the collected list as a baseline for the database, collecting a list of items in the database on a periodic basis, determining if an item has been changed by comparing the current list of items with the original list of items. Tracking modifications in a database application executing on a database management system would include the steps of inventorying the database in order to discovery a list of objects, settings, and values in the database, saving the inventory of objects, settings, and values of the database, subsequently collecting a new list of objects, settings, and values in the database, comparing the new list of objects, settings, and values with the original inventory of the database.

A database item is typically a table, trigger, view, stored procedure, index, database, schema, or function. The item can also be a configuration option, permission setting, access control setting, or system parameter. Other database items include strings and numeric or binary data stored in a table. Comparing the items in a database application would include searching for items that have been dropped, created, modified, recreated, expanded, or reduced, collectively referred to as changes. Collecting the list of items may include examining the data dictionary for the database and calling functions within the database to enumerate a list of configuration settings or options.

Creating a baseline for detecting changes to a database application includes the steps of connecting to the database application, running SQL statements and other commands in order to enumerate the items in the database, saving information on items in the database to persistent storage. Re-inventorying the database application includes the steps of connecting to the database application on a periodic basis (i.e., a second instance or instance subsequent to establishing the baseline), running SQL statements and other commands in order to enumerate the items in the database, collecting information on items in the database.

Detecting changes in items in the database includes the steps of enumerating each item in the re-inventory with items in the baseline, determining if any items exist in the baseline but not in the re-inventory, determining if any items exist in the re-inventory but not in the baseline, determining if any items in both the baseline and the re-inventory have been changed by comparison. The system is able to incorporate modifications from a re-inventory of the database into a baseline, which includes the steps of updating the baseline with the item from the re-inventory, removing the item from the baseline if it no longer exists in the re-inventory, adding the item to the baseline if it is not in the baseline and exists in the re-inventory. Collecting the list of objects may include examining the data dictionary for the database, and calling functions within the database to enumerate a list of configuration settings.

Web Applications

The method as applied to web applications would include the steps of collecting a list of items in the web application, setting the collected list as a baseline for the web application, collecting a list of items in the web application on a periodic basis, determining if an item has been changed by comparing the current list of items with the original list of items.

Typical items for a web application include files, HTML or XML pages, web pages, functions, virtual directories, web directories, dynamic scripts, and source code. Items may also include configuration options, permission settings, access control settings, and system parameters, strings, and numeric or binary data stored in a table or file. Collecting the list of objects may include calling functions within the web server, web application, or operating system to enumerate a list of configuration options and examining the metadata for the application. Collecting the list of settings includes calling functions within the application to enumerate a list of configuration settings.

Comparing the list of items includes the steps of searching for objects, settings, or values that have been dropped, created, modified, recreated, expanded, or reduced, collectively referred to as changes. For web applications, the comparison step may also include step of crawling the web application and actuating all web interfaces. It may also include calling functions within the web server, web application, or operating system to enumerate a list of configuration settings.

The method for web applications also includes establishing a baseline for detecting changes. The steps include connecting to the web application, running commands in order to enumerate the items in the web application, crawling the web application in order to enumerate the items in the web application, saving information on items in the web application to persistent storage. Compiling a re-inventory (second or subsequent to the baseline inventory) includes the steps of connecting to the web application on a periodic basis subsequent to the creation of the baseline, crawling the web application in order to enumerate the items in the web application, running commands in order to enumerate the items in the web application, collecting information on items in the web application. Detecting changes between the baseline and re-inventory includes the steps of enumerating each item in the re-inventory with items in the baseline, determining if any items exist in the baseline but not in the re-inventory, determining if any items exist in the re-inventory but not in the baseline, and determining if any items in both the baseline and the re-inventory have been changed.

The invention can also in incorporate modifications from a re-inventory into a baseline, which includes the steps of updating the baseline with an item from the re-inventory, removing the item from the baseline if it no longer exists in the re-inventory, adding the item to the baseline if it is not in the baseline and exists in the re-inventory.

Since other modifications or changes will be apparent to those skilled in the art, there have been described above the principles of this invention in connection with specific apparatus, it is to be clearly understood that this description is made only by way of example and not as a limitation to the scope of the invention.

What is claimed is:

1. A method for detecting modifications in an application executing on a computer system comprising:
   connecting to the application on the computer system;
   inventorying the application in order to discover a baseline inventory of existing items in the application, wherein the baseline inventory of existing items in the application includes a set of stored procedures, the set of stored procedures including user-defined stored procedures and system stored procedures, the step of inventorying comprising the step of running commands or requests in order to enumerate the items in the application;
   storing the baseline inventory to persistent storage;
   collecting a second inventory list of items in the application by running commands or requests in order to enumerate a second set of items in the application;
   comparing the second inventory list of items with the baseline inventory of the application to determine a set of differences between them by enumerating each item in the second inventory with items in the baseline inventory, determining if any item exists in the baseline inventory but not in the second inventory, determining if any item exists in the second inventory but not in the baseline inventory, determining if any item in both the baseline inventory and the second inventory has been changed;
   reporting out the set of differences between the baseline inventory and the second inventory to enable a determination of whether unauthorized activity has occurred at the application level;
   determining from the set of differences between the baseline inventory and the second inventory an instance of unauthorized activity; and
   authorizing or rejecting the instance of unauthorized activity.

2. The method according to claim 1, further comprising the steps of:
   updating the baseline inventory with an item from the second inventory;
   removing the item from the baseline inventory if it no longer exists in the second inventory;
   adding the item to the baseline inventory if it is not in the baseline inventory and it exists in the second inventory.

3. The method according to claim 1, further comprising the step of recording the set of differences in persistent storage.

4. The method according to claim 1, wherein the item is a set of objects including tables, views, stored procedures and triggers.

5. The method according to claim 1, wherein the item is a group of settings including configuration options, permission settings and system parameters.

6. The method according to claim 1, wherein the item is a set of values including a string value, a numeric data value stored in a table and a binary data value stored in the table.

7. A method for detecting unauthorized modifications in a database application executing on a computer system comprising:
   connecting to a database;
   inventorying the database in order to discover a baseline inventory of existing items in the database, wherein the baseline inventory of existing items in the application includes a set of stored procedures, the set of stored procedures including user-defined stored procedures and system stored procedures, the step of inventorying comprising the step of running commands or requests in order to enumerate the items in the database;
   storing the baseline inventory to persistent storage;
   collecting a second inventory list of items in the database by running commands or requests in order to enumerate a second set of items in the database;
   comparing the second inventory list of items with the baseline inventory of the database to determine a set of differences between them by enumerating each item in the second inventory with items in the baseline inventory, determining if an item exists in the baseline inventory but not in the second inventory, determining if an item exists in the second inventory but not in the baseline inventory, determining if an item in both the baseline inventory and the second inventory has been changed;
   reporting out the set of differences between the baseline inventory and the second inventory to enable a determination of whether unauthorized activity has occurred at the application level;
   determining from the set of differences between the baseline inventory and the second inventory an instance of unauthorized activity; and
   authorizing or rejecting the instance of unauthorized activity.

8. The method according to claim 7, further comprising the steps of:
   updating the baseline inventory with an item from the second inventory;
   removing the item from the baseline inventory if it no longer exists in the second inventory;
   adding the item to the baseline inventory if it is not in the baseline inventory and it exists in the second inventory.

9. The method according to claim 7, further comprising the step of recording the set of differences in persistent storage.

10. The method according to claim 7, wherein the command is a SQL statement.

11. The method according to claim 7, wherein collecting the list of items includes examining a data dictionary for the database.

12. The method according to claim 7, wherein collecting the list of items includes calling functions within the database to enumerate a list of configuration settings or options.

13. A method for detecting unauthorized modifications in a web application executing on a server comprising:
   connecting to the web application on the server;
   inventorying the web application in order to discover a baseline inventory of existing items in the web application, wherein the baseline inventory of existing items in the application includes a set of stored procedures, the set of stored procedures including user-defined stored procedures and system stored procedures, the step of inventorying comprising the steps of crawling the web application and running commands in order to enumerate the items in the web application;

storing the baseline inventory to persistent storage;

collecting a second inventory list of items in the web application by crawling the web application and running commands in order to enumerate a second set of items in the web application;

comparing the second inventory list of items with the baseline inventory of the web application to determine a set of differences between them by enumerating each item in the second inventory with items in the baseline inventory, determining if an item exists in the baseline inventory but not in the second inventory, determining if an item exist in the second inventory but not in the baseline inventory, determining if an item in both the baseline inventory and the second inventory has been changed;

reporting out the set of differences between the baseline inventory and the second inventory to enable a determination of whether unauthorized activity has occurred;

determining from the set of differences between the baseline inventory and the second inventory an instance of unauthorized activity; and authorizing or rejecting the instance of unauthorized activity.

14. The method according to claim 13, further comprising the steps of:

updating the baseline inventory with an item from the second inventory;

removing the item from the baseline inventory if it no longer exists in the second inventory;

adding the item to the baseline inventory if it is not in the baseline inventory and it exists in the second inventory.

15. The method according to claim 13, wherein the step of crawling the web application includes the step of actuating a web interface.

16. The method according to claim 13, further comprising the step of recording the set of differences in persistent storage.

* * * * *